Nov. 3, 1964   W. H. SCHYMIK ETAL   3,155,471
DRY AIR SYSTEM FOR ISOLATED PHASE BUS
Filed May 1, 1959                                    3 Sheets-Sheet 1

INVENTORS
WALTER H. SCHYMIK
JOSEPH V. McNULTY
BY
ATTORNEYS

Nov. 3, 1964

W. H. SCHYMIK ETAL 3,155,471

DRY AIR SYSTEM FOR ISOLATED PHASE BUS

Filed May 1, 1959

INVENTORS
WALTER H. SCHYMIK
JOSEPH Y. McNULTY

BY

ATTORNEYS

Nov. 3, 1964

W. H. SCHYMIK ETAL 3,155,471

DRY AIR SYSTEM FOR ISOLATED PHASE BUS

Filed May 1, 1959

INVENTORS
WALTER H. SCHYMIK
JOSEPH V. McNULTY

BY

ATTORNEYS

United States Patent Office 3,155,471
Patented Nov. 3, 1964

3,155,471
DRY AIR SYSTEM FOR ISOLATED PHASE BUS
Walter H. Schymik, Oreland, and Joseph V. McNulty, Morristown, Pa., assignors to I-T-E Circuit Breaker Company, Philadelphia, Pa., a corporation of Pennsylvania
Filed May 1, 1959, Ser. No. 810,482
1 Claim. (Cl. 55—162)

The instant invention relates to an isolated phase bus in general and more particularly to novel means for preventing condensation within the bus housing.

A Megger test upon an isolated phase bus made right after a shut-down may give a low reading, possibly due to moisture condensed upon the isolators. When the bus has been performing satisfactorily there need be no hesitancy about reenergizing it if, upon inspection, the insulators are found to be clean. In the case of clean insulators condensed moisture forms in discrete drops so that no continuous moisture conducting path exists over the insulator surfaces and the insulators will withstand voltage not much lower than dry insulators.

A dry insulator is the best from an insulating standpoint while a clean insulator with drops of water on the surface thereof is not far behind. A dusty dry insulator is not bad but a dirty wet insulator is cause for concern since the dirt upon the insulator absorbs moisture to provide a more or less continuous conducting path so that the insulator may flash over at a low voltage. In the case of clean insulators, after reenergizing of the bus, moisture on the insulator will evaporate and the original conditions will be restored.

Isolated phase bus carrying rated load in an environment of more or less constant ambient does not have any condensation therein. However, a large abrupt drop in ambient temperature causes condensation. Air can hold a definite amount of moisture depending upon its temperature, with the amount of moisture varying directly with air temperature. A slight decrease in the temperature of saturated air causes some moisture to come out as condensate. Before condensation will occur, the temperature of non-saturated air must be lowered to that at which, for the moisture content, the air is saturated.

In general, air within the enclosure of isolated phase bus is like air outside of the enclosure and the moisture content is the same. However, when the bus is operating the temperature of the inside air is higher than that of the outside air so that the inside air is capable of holding more moisture than it contains. For condensation to occur within the enclosure, the temperature of the inside air must drop to at least the temperature of the outside air. There will be condensation in the outside air as temperature decreases, before any condensation occurs inside the bus enclosure.

Condensation is more likely to occur when a bus is lightly loaded or not carrying a load. A tap from the main bus to a small load, such as the auxiliary transformer in a generating station is a case where light loading is normal. That is, the main buses are electrically oversized in order that they may be mechanically adequate so that they will surve short circuits. A short circuit at these main buses is usually fed from sources at both ends of the main bus, hence, the buses must be mechanically strong.

Prior art buses have even been provided with drains at the low points of the enclosure. This prevents progressive accumulation of moisture. However, abrupt temperature drop results in condensation upon the insulators of the bus.

Another prior art means for preventing condensation was to maintain the bus enclosure filled with a dry inert gas such as nitrogen. The enclosure is made gas tight and a pressure slightly greater than atmospheric pressure is maintained to prevent the entrance of outside air. However, there are some practical difficulties with this arrangement. In the initial installation of the bus the enclosure may be made gas tight, but the settlement of a transformer or building contributing to the support of the bus structure causes misadjustment of the sealing gaskets or flaws in the packings thereby impairing the seal.

The quantity of gas and gaskets required may be reduced by utilizing welded joints. While a gas tight enclosure containing gas under pressure clearly prevents entrance of air carrying dust so that contamination of the insulator is impossible, pressure variations due to temperature change must be duly considered. That is, gas pressure may rise due to the heating effect of the sun's rays or other slight change in environment. Even in moderate sizes of isolated phase bus, the areas exposed to the internal gas pressure are large so that the resultant total thrust upon these areas is high. Thus, for protection, safety valves must be included and upon the operation of the safety valves there is a loss of expensive gas.

In the instant invention a continuous flow of comparatively dry air through the bus enclosure effectively prevents condensation. Dry clean air is forced into the enclosure by a blower. The enclosure is provided with openings through which the air may exit. At places other than planned exits, the enclosure need not be air tight since a small amount of random leakage is relatively unimportant. The planned exits are small in size since the air velocity within the enclosure is very low.

Air flowing through the enclosure need not be absolutely dry. It is only necessary that the air be acceptably dryer than the outside air. That is, the air flowing through the enclosure must have a dew point sufficiently lower than that of the outside air to allow for anticipated sudden drop in ambient temperature without causing condensation.

In the system of the instant invention outside air, after being cleaned and dried, is forced into the enclosure by a rotary blower. Considering the moisture content of the outside air as a datum the air flowing through the bus is made drier than the outside air to a degree determined by the operating environment of the isolated phase bus system.

Variations in pressure due to temperature change are limited and the system adjusts automatically to these changes. That is, temperature change is not sudden, hence neither is the resultant pressure change.

As the ambient temperature rises, pressure within the enclosure tends to rise but the rate of rise is limited by the planned leakage and by the fact that the enclosure automatically accepts less air from the blower. The rate of air flow within the enclosure is determined by the resistance to flow, including due consideration to the pressure within the enclosure opposing air flow. For extreme cases, should air pressure within the enclosure rise too rapidly for the planned exit of air to control this rise, air will simply flow in a reverse direction through the blower thereby achieving an automatic adjustment for the system.

Automatic adjustment for the decrease of pressure within the enclosure due to a drop in temperature is similar since the pressure within the enclosure is the back pressure upon the blower. As the back pressure drops the enclosure automatically accepts more air from the blower. In both cases, since air is moved through the enclosure and exhausted to the atmosphere, pressure within the enclosure is always higher than atmospheric pressure. Therefore, unprocessed outside air cannot enter the enclosure and cause contaimination therein.

Accordingly, a primary object of the instant invention is to provide a novel arrangement for preventing condensation from forming within the enclosure of an isolated phase bus.

Another object is to provide novel means for preventing condensation within the housing of isolated phase bus whose operation is simple and will adjust automatically to changes in environment.

Still another object is to provide a system for preventing condensation within an isolated phase bus which utilizes outside air as a reference for all variables such as pressure temperature and moisture content.

A further object is to provide novel means for preventing condensation within the housing of isolated phase bus including desiccator means and timing means for controlling the reactivation of one desiccator unit while the other desiccator unit acts to remove moisture from the air prior to its entry into the bus housing.

These as well as other objects of the instant invention shall become readily apparent after reading the following description of the accompanying drawings in which:

FIGURE 4 is a schematic diagram illustrating isolated phase bus connected between a power source and a transformer.

FIGURE 5 is a cross-sectional view of a transfer valve of the type utilized in the device of the instant invention.

Figure 1:
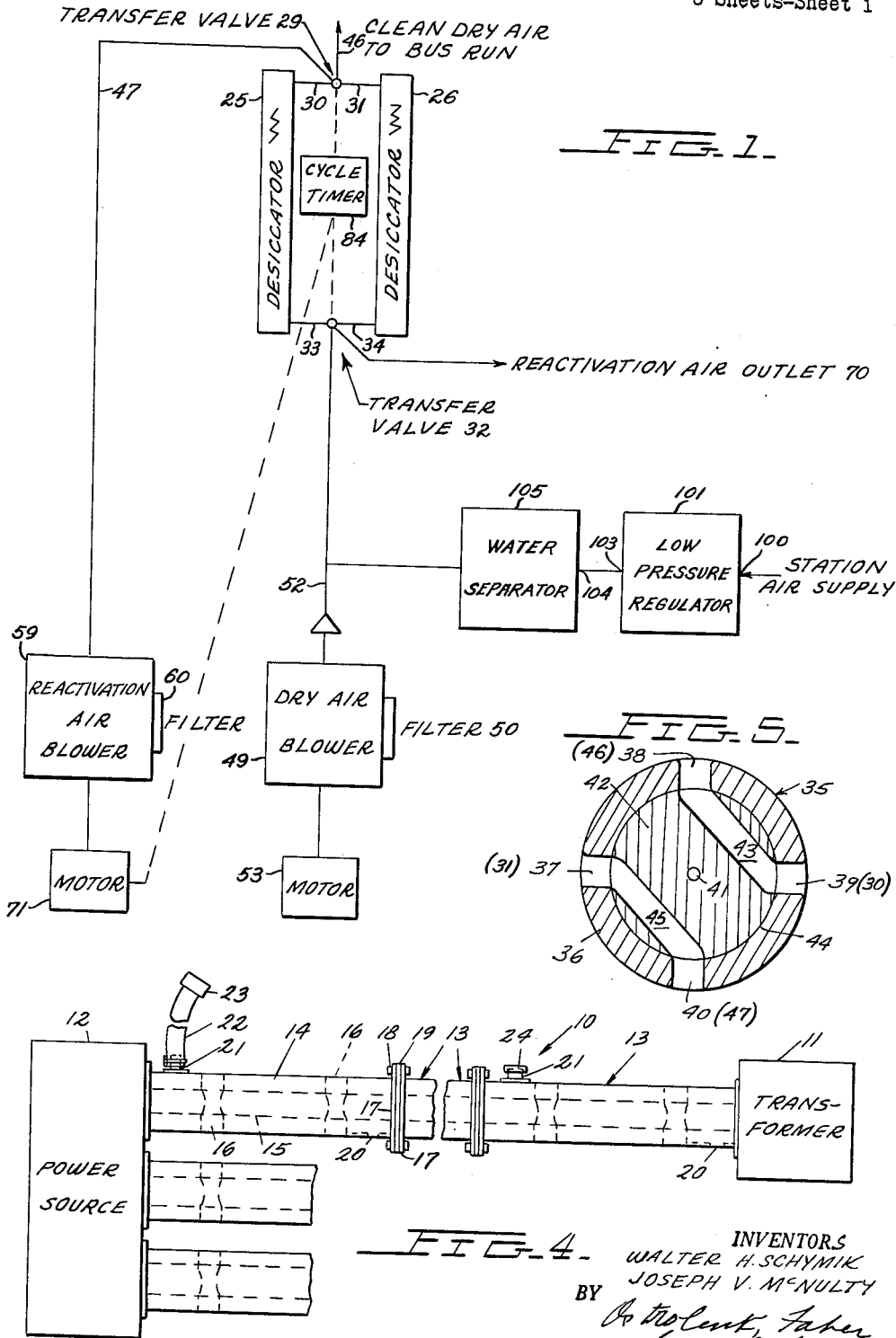
FIGURE 1 is a schematic diagram illustrating a system, constructed in accordance with the instant invention, for supplying a continuous flow of dry clean air to isolated phase bus.
Figure 2:
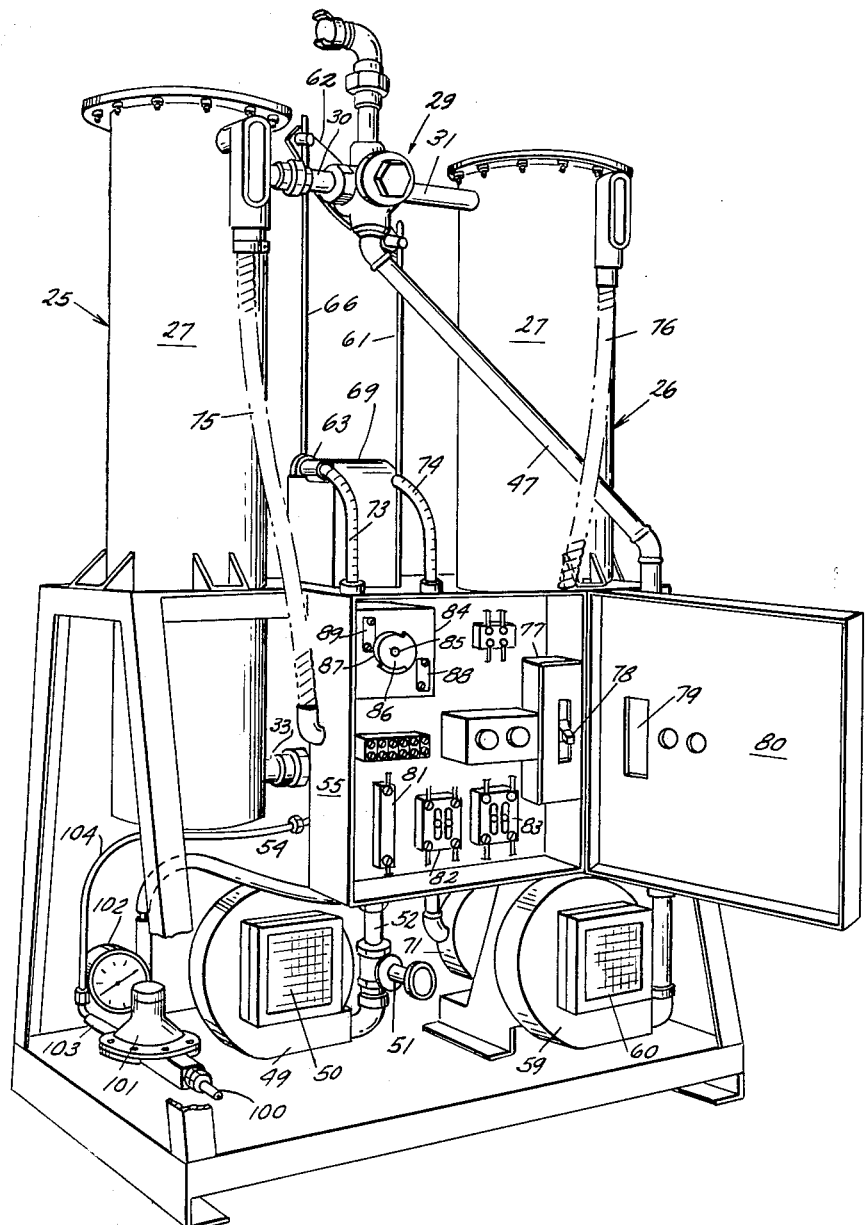
FIGURE 2 is a front view in perspective of a desiccator means utilized with the instant invention.

Now referring to the figures, the isolated phase bus 10 which connects transformer 11 to power source 12 (FIGURE 4) comprises a plurality of substantially identical sections 13 connected in axial alignment. Each of the sections 13 of isolated phase bus may be of the type described in detail in U.S. Patent 2,775,642 to W. M. Scott, Jr., entitled "Half Circular Bus Bracket," and assigned to the assignee of the instant invention.

Briefly, each bus section 13 comprises an elongated housing 14 and a hollow conductor 15 disposed within housing 14 and maintained in spaced insulating relationship therefrom by a plurality of insulators 16. Adjacent housings 14 are secured together at end flanges 17 by bolt means 18 with circular gaskets 19 being interposed between flanges 17 of adjacent bus housings 14.

Planned exit openings 20 are provided in housings 14 as are entrance openings 21, for a purpose to be hereinafter explained. Hose 22 is clamped at one end thereof to the neck which surrounds the entrance opening 21 of the bus section 13 which is adjacent to power source 12. The other end of hose 22 is provided with a coupling device 23. Caps 24 are clamped to the necks surrounding entrance openings 21 of all other bus sections 13.

A continuous supply of clean dry air is supplied to isolated phase bus 10 by means including first and second desiccator units 25, 26. Each of the desiccator units 25, 26 comprises an elongated tank 27 mounted to frame 28 in a vertical position. Each tank 27 contains a desiccating agent, such as activated alumina, and suitable strip heaters (not shown) for a purpose to be hereinafter explained. Transfer valve 29 is connected to the tanks 27 of units 25, 26 near the tops thereof by conduits 30, 31, respectively, while transfer valve 32 is connected to desiccator units 25, 26 near the bottoms thereof by conduits 33, 34, respectively.

Each of the valves 29 and 32 are of substantially the same construction and are of a valve type illustrated schematically in FIGURE 5. The valve 35 of FIGURE 5 comprises a body 36 having a ring-like cross-section with openings 37–40 spaced at 90° intervals about the center of rotation 41 of valve core 42. Valve core 42 is a flat circular member provided with a first passage 43, which extends between two points at the periphery 44 of core 43 which are disposed 90° distant from one another. A second passage 45 is also provided through valve core 42 with the second passage 45 extending between two other points on the periphery of core 42 which are distant 90° from one another as well as 90° distant from the points joined by passage 43.

With core 42 in the position of FIGURE 5, body openings 37, 40 are connected by core passage 45 and body openings 38, 39 are connected by core passage 43. When core 42 is rotated clockwise about 41 through 90°, core passage 45 interconnects body openings 37, 38 and core passage 43 interconnects body openings 39, 40. Typically, conduits 30, 31 are connected to body openings 38, 37, respectively, and conduits 46, 47 are connected to body openings 39, 40, respectively.

Centrifugal blower 49, having filter 50 at the intake thereof, has the output thereof connected through shut-off valve 51 and conduit 52 to the lower transfer valve 32. Blower 49 is powered by an electric motor 53, energized through cable 54 extending to control cabinet 55 which is mounted to cross-member 56 of frame 28. Air supplied by blower 49 passes through conduit 52 to lower transfer valve 32 and, depending upon the position of the core of valve 32, will pass to one or the other of the desiccator units 25, 26. After passing upwardly through one of the desiccator units 25, 26, the moisture content of the air is reduced considerably by the desiccating agent and this clean dry air passes through upper valve 29 to conduit 46. The coupling 23 at the end of hose 22, which is connected to bus section 13, is constructed to be readily connected to coupling device 57 which is at the free end of conduit 46.

Thus, the clean dry air enters housing 14 through entrance opening 21 in housing 14. This air flows through housing 14 and a majority of the air exits at planned openings 20. Some of the clean dry air may leak at the joints formed by flanges 17 and gaskets 19 but this is not important in that the amount of air supplied by blower 49 is always of a quantity sufficient to assure that air will flow into housing 14 at the single entrance opening 21 to the left and will leave at all planned exit openings 20.

Figure 3:
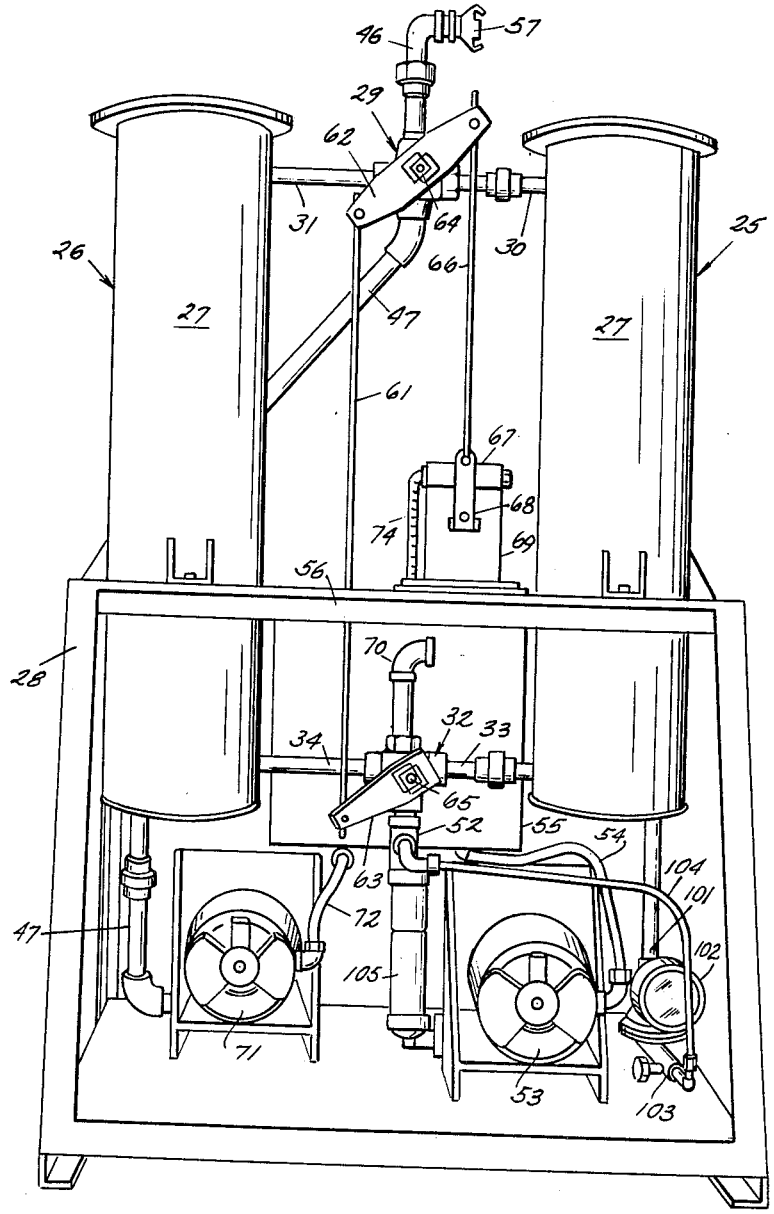
FIGURE 3 is a rear view in perspective of the desiccator means of FIGURE 2.

The cores of valves 29 and 32 are ganged for simultaneous operation by rod 61, pivotally mounted to and acting through cranks 62, 63 which are keyed to stub shafts 64, 65, respectively. Shafts 64, 65 form the centers of rotation for the cores of valves 29, 32, respectively. The upper crank 62 is pivotally connected to rod 66 which is pivotally connected keyed to the output shaft 68 of solenoid switch 69. Switch 69 is illustrated in one of its two operable positions. In the other operable position crank 67 is rotated approximately 90° clockwise with respect to FIGURE 3, about 68. This causes clockwise rotation of pivots 64, 65 thereby rotating the cores of valves 29 and 32.

The desiccating agent within tank 27 must be reactivated periodically so that its moisture removing capabilities does not fall below acceptable levels. In order to accomplish this a second centrifugal blower 59 is provided. Driving power is supplied to centrifugal blower 59 by motor 71 which is energized through cable 72 entered into control box 55. Cables 73, 74 extend from control box 55 to switch 69 for operation thereof while cables 75, 76 extend to desiccator units 25, 26, respectively, for operation of the strip heaters. Filter 60 is placed at the input of blower 59 and the air output thereof flows upwardly through conduit 47 to upper transfer valve 29.

When cores 29 and 32 are positioned so that blower 49 forces air through desiccator unit 25, air supplied by blower 59 will pass upwardly through conduit 47 to valve 29 where the air from blower 59 will be directed through conduit 31 into desiccator unit 26 thence, through conduit 34 into lower valve 32 where the air will be exhausted through outlet 70. While air from blower 59 passes through the desiccator unit 26, the strip heater of this unit is actuated. The heat generated by the strip heater drives moisture from the desiccating agent and the air supplied by blower 59 carries the liberated moisture from tank 27 in unit 26 thereby reactivating the desiccator unit 26.

Disposed within control cabinet 55 is a main circuit breaker 77 whose manual operating handle 78 is positioned to extend through opening 79 in cabinet door 80 when door 80 is closed. Also disposed within cabinet 55 are relays 81–83 as well as cycle timing means 84. Relay 81 controls the oepration of reactivation blower motor 71. Relay 82 is a double pole unit having a set of front and a set of back contacts for alternately energizing the strip heaters of desiccator units 25, 26. Relay 83 is a double pole unit which controls the periods of energization for strip heaters within tanks 27 by acting through relay 82.

Cycle timing means 84 comprises a synchronous motor and gear means (not shown) which drive shaft 85. Cams 86, 87 are keyed to shaft 85 and are operatively positioned to operate micro-switches 88, 89. Micro-switch 88 controls the operation of relay 82 and also controls the operation of solenoid switch 69 thereby controlling the positions of transfer valves 29, 32. Micro-switch 89 controls the operation of relay 81 thereby controlling the operation of reactivation blower motor 71 and also controls the operation of relay 83 which energizes the appropriate strip heater as determined by relay 82.

Operation of the device described to this point is initiated by means of operating handle 78 of main circuit breaker 77. When circuit breaker 77 is thrown to the On position operation of the centrifugal blower 49 is initiated. Air passes through filter means 50, is directed to lower transfer valve 32 and is then conducted to one of the desiccator units 25, 26 depending upon the position of solenoid switch 69. Assuming that switch 69 is conditioned such that the air from blower 49 is directed through desiccator unit 25, this air will have a considerable amount of its moisture content removed by the desiccating agent within tank 27 in unit 25 before exiting through conduit 30. The clean relatively dry air then passes through the upper valve 29 and is directed to the housing 14 where the air will flow through housings 14. The restricted exit openings 20 cause pressure to build up within housings 14 thereby preventing dirty or moist air from entering housing 14.

Air supplied by blower 49 will continue to flow through desiccator unit 25 during a first interval of time as determined by the shape of cycle timer cams 86, 87. When the condition of micro-switch 88 is changed by cams 86, 87, solenoid switch 69 will be operated to a different position wherein shaft 68 is rotated 90° clockwise from the position illustrated in FIGURE 3 and relay 81 will initiate operation of reactivation blower 59. During the first portion of the first interval, reactivation blower 59 forces air through conduit 47 to upper valve 29, through conduit 31, through disaccator means 26, through conduit 34 and lower valve 32, and thence through exhaust 70. During this portion of the first interval micro-switch 89 conditions relay 83 to supply power to relay 82. Relay 82 in turn distributes this power to the strip heaters of disaccator unit 26.

Thus, during the first portion of the first interval the desiccating agent of desiccator unit 26 is being heated so that moisture is being driven therefrom. The liberated moisture is absorbed by the air from blower 59 passing downwardly through tank 27 of desiccator unit 26, which is thereafter exhausted through exhaust 70. This operation reactivates the desiccating agent of desiccator unit 26.

At the end of the first portion of the first interval cams 86, 87 condition micro-switch 89, which in turn operates relay 81, so as to deenergize motor 71 of reactivation blower 59, and also operate relay 82 so that main power is no longer supplied to relay 83. Thus, the strip heaters of unit 26 are now deenergized and blower 59 ceases to force air through unit 26. This condition prevails until the end of the first interval.

At the end of the first interval a second interval begins. During the second interval transfer valves 29, 32 are conditioned to conduct air from blower 49 to desiccator unit 26 and during a first portion of the second interval air supplied by reactivation blower 59 is directed through desiccator unit 25. Also during the first portion of the second interval relays 82 and 83 cooperate to energize the strip heaters of desiccator unit 25 so as to cause reactivation of the desiccator agent thereof.

When the first portion of the second interval has come to an end the strip heaters of desiccator unit 25 and reactivation blower motor 71 are deenergized. At the termination of the second interval the first interval once again commences. It is to be noted that blower 49 operates continuously throughout the entire first and second intervals. Thus, desiccator units 25, 26 alternately remove a portion of the moisture from the air supplied by centrifugal blower 49 before entry of this air into the bus run 10.

While one of the desiccator units 25, 26 acts as a dehydrating means the other of the units 25, 26 is being reactivated by heating and air supplied by blower 59. Typically, each unit 25, 26 will act as a dehydrating means for a three hour interval so that the reactivation interval also consists of a three hour period. The strip heaters and reactivation blower 59 are energized for the initial two hours of the three hour reactivation period and during the last hour of the reactivation period the unit 25 or 26 is cooled.

With the device as hereinbefore described supplying clean relatively dry air to housing 14 the maximum pressure will be the no loss pressure and will be in the order of 6 inches of water. The typical pressure will be in the order of three inches of water and the low pressure will also be three inches of water provided that units 25, 26 are properly designed for bus 10.

Typical ambient conditions and accompanying bus conditions are listed below:

| | Ambient Conditions | Bus Conditions |
|---|---|---|
| Temp. dry bulb _____ °F____ | 95 | 95 |
| Temp. wet bulb _____ °F____ | 79 | 63 |
| Relative Humidity _____ Percent__ | 51 | 15 |
| Dew Point _____ °F____ | 74 | 40 |

It is to be noted that the pressure within bus enclosure 14 is the back pressure acting upon centrifugal blower 49. Since the back pressure acting upon a centrifugal blower controls the air output of the blower the pressure within bus enclosure 14 will regulate the output of blower 49. That is, if there is a rise in temperature which causes a rise in the internal pressure of bus housing 14 the quantity of air supplied by blower 49 will be reduced. Thus, excessive pressures will not be built up within bus housing 14 so as to put undo stresses upon standoff insulators 16. In extreme cases the pressure built up within housing 14 due to influences other than blower 49 will cause air to flow in reverse through blower 49.

The gas pressure generating source comprising centrifugal blower 49 may be replaced by a compressed air supply (not shown) which is quite often found at the station where bus run 10 is located. The compressed air supply is connected to the input 100 of adjustable pressure regulator 101. Gauge 102 indicates the pressure in the outlet 103 of regulator 101, hence, the pressure within bus enclosure 14.

Air is directed from regulator outlet 103 through line 104 to water separator 105 which removes water in liquid form from the air. After passing through separator 105 the air passes to lower transfer valve 32 where the action previously described, in connection with air supplied by blower 49, takes place.

The electrical connections between the primary power source through circuit breaker 77 to relays 81, 83 as well as the electrical connections between switches 88, 89 and relays 81-84 have been omitted so as not to clutter up the record. These electrical connections are apparent to those skilled in the art.

While the foregoing description has described the bus housing as having planned openings, it is to be understood that they are, as a practical matter, not always required. That is, in a welded type of bus construction even though an attempt is made to eliminate all leaks, it is impractical to do so. Thus, leakage openings, even though not planned are present even in welded bus.

In the foregoing we have described our invention in connection only with preferred and illustrated embodiments thereof. Since many variations and modifications of our invention are now obvious to those skilled in the art, we prefer to be bound not by the specific disclosures herein contained but only by the appended claim.

We claim:

An isolated phase bus and means for preventing condensation within said bus; said bus comprising an elongated conductor and a housing surrounding said conductor and spaced therefrom; said means comprising a first gas pressure generating source, conduit means forming a path which guides gas from said source through an opening in said housing, and desiccator means operatively positioned whereby gas of said source is acted upon by said desiccator means prior to the entry of said gas into said housing; said housing having leakage openings; said leakage openings and said gas pressure generating source being proportioned whereby pressure is maintained within said housing sufficient to prevent air from entering said housing through said leakage openings; said desiccator means comprising a first and a second desiccator unit; valve means connected to said conduit means for alternatively directing said gas through one of said units while by-passing the other of said units; each of said units including reactivating means; means for alternately actuating the reactivating means of each of said units for at least a portion of the time said gas is directed through the other of said units; said reactivating means comprising heating means individual to each of said units and a second gas pressure generating source operatively connected to said valve means whereby gas from the last recited of said sources is directed to the one of said units which is by-passed by the gas from the first recited of said sources; and a cycle timer operatively connected to said valve means for automatic control thereof; said cycle timer also automatically controlling operation of said reactivating means; said first gas pressure source comprising a compressed air supply and an adjustable pressure regulator operatively positioned and connected between said compressed air supply and said valve means; a water separator, operatively positioned between said adjustable pressure regulator and said valve means; said valve means being adapted to direct gas from said second source downward through the one of said units which is bypassed by said first gas pressure source and being further adapted to direct gas from said first gas pressure source upward through the other one of said units.

References Cited in the file of this patent

UNITED STATES PATENTS

| | | |
|---|---|---|
| 1,541,147 | Ikeda | June 9, 1925 |
| 1,866,611 | Affel | July 12, 1932 |
| 2,190,168 | Armistead | Feb. 13, 1940 |
| 2,320,093 | Moore | May 25, 1943 |
| 2,494,644 | Clement | Jan. 17, 1950 |
| 2,563,042 | Jaubert | Aug. 7, 1951 |
| 2,584,889 | Latour | Feb. 5, 1952 |
| 2,699,837 | Van Note | Jan. 18, 1955 |
| 2,775,642 | Scott | Dec. 25, 1956 |
| 2,882,998 | Grenier | Apr. 21, 1959 |
| 2,884,855 | Koch | May 5, 1959 |

FOREIGN PATENTS

| | | |
|---|---|---|
| 26,859 | Great Britain | Nov. 30, 1911 |